Inventor
Werner Auer

United States Patent Office 3,443,321
Patented May 13, 1969

3,443,321
GYROCOMPASS FOLLOW-UP SYSTEM
Werner Auer, Heidelberg-Wieblingen, Germany, assignor to Teldix Luftfahrt-Ausrustungs G.m.b.H., Heidelberg-Wieblingen, Germany
Original application Mar. 11, 1965, Ser. No. 438,977, now Patent No. 3,386,179, dated June 4, 1968. Divided and this application Apr. 13, 1967, Ser. No. 630,585
Claims priority, application Germany, Apr. 24, 1964, T 26,070
Int. Cl. G01c 19/38
U.S. Cl. 33—226       5 Claims

ABSTRACT OF THE DISCLOSURE

A gyrocompass rotor frame is mounted on a stable vertical-axis low-friction air bearing. It is torqued azimuthally by springs which also serve as electrical connections between the rotor frame and an enclosing casing rotatable in azimuth by a follow-up motor controlled by a pick-off between the casing and the rotor frame. The pick-off signal amplification is, for the first part of the meridian seeking swing, made such as to damp the oscillatory transients most rapidly; and when the pick-off signal, or alternatively the amplifier output, has fallen below a predetermined value, a program of increased amplification is automatically initiated.

REFERENCE TO RELATED APPLICATION

This is a division of application Ser. No. 438,977, filed Mar. 11, 1965, now Patent No. 3,386,179 dated June 4, 1968.

BACKGROUND OF THE INVENTION

The present invention relates to a gyrocompass, and particularly to a follow-up system for connection between the rotor element and the casing of such gyrocompass.

A conventional gyrocompass incorporates a one-degree-of-freedom gyro rotor in which a first frame or gimbal carrying the rotor is rotatable with respect to a second frame or housing, the first frame being rotationally elastically coupled to the second frame by means of a torque generator or so-called torquer. The second frame is rotatable with respect to the earth about a vertical axis and the first frame rotates within the second frame about the same axis. The gyro rotor is so mounted in the first frame that the spin axis of the rotor is always at right angles to the axis of the frame, i.e., that the spin axis is always horizontal to the same extent that the frame axis is vertical. Suitable electric read-out or so-called pick-off means are provided which produce a signal that is a function of the angle between the two frames, and the value read-out is applied to the torquer in such a manner as to produce a torque which acts against an increase of the angle. In this way, the pick-off means and the torquer form a system which in effect spring-couples the two frames to each other. If no external forces act on the frames, they will assume a definite angular position with respect to each other.

Inasmuch as, due to the horizontal component of the earth's rotation, the rotor has the tendency to align its spin axis with the north-south direction, the gyrocompass can be used to find the true or polar north by manually turning the second frame until it coincides with the first frame, i.e., until the second frame assumes the quiescent position of coincidence between the spin axis and the housing spin reference axis dictated by the above-mentioned pick-off means and torquer.

Another type of conventional gyrocompass, which operates on essentially the same principle, additionally includes a follow-up system which consists of an amplifier and a servomotor that drives the second frame about its axis. So long as the two frames form an angle with each other, the servomotor will drive the second frame in such a direction as to reduce the angle. After the oscillations have decayed—which delays the time until the compass accurately indicates true north—the two frames will assume their rest positions. As in the case of the first-described gyrocompass, the direction of the spin avis of the rotor is indicated by means of the second frame, or is otherwise suitably utilized as a true-north reference.

SUMMARY OF THE INVENTION

It is therefore a primary object of the present invention to provide a gyrocompass having a follow-up system which overcomes the above-noted drawbacks.

Another object of the present invention is to provide a gyrocompass having a very low "warm-up" time so that it indicates the north-south direction shortly after being put into operation.

The follow-up system according to the present invention may be provided in a gyrocompass of the type described in the above-mentioned Patent No. 3,386,179. Such a gyrocompass is, basically, a one-degree-of-freedom gyrocompass in which the first frame, i.e., the frame which supports the gyro rotor and its electric drive motor, is in the form of a cylinder and the second frame is in the form of a cup-shaped housing, the cylinder being mounted in the cup-shaped housing for rotation about the vertical axis, and there being air-cushioning between the cylinder and housing so that a so-called gas bearing is formed. Furthermore, mechanical spring elements are provided which provide an elastic coupling acting against the rotation of the two frames relative to each other about the vertical axis, and these mechanical spring elements further serve as the current lead-in means by which electrical energy is supplied to the gyro rotor drive motor from an external power source. In practice, the spring means may also constitute the electrical connection between a pick-off component that is movable with the first frame and the remainder of a follow-up system, the latter being interposed between the two frames and responsive to the angle formed between them for applying to the second frame a force proportional to the angle between the frames for aligning the second frame with the north-south direction.

In accordance with the present invention, the follow-up system which is interposed between the first frame and the gyrocompass casing incorporates an amplifier for feeding a servo motor which is arranged to drive the casing in such a direction as to align a diametral plane of the casing with the rotor spin axis. This follow-up system differs essentially from conventional prior art follow-up amplifiers as follows: the amplifier produces a so-called aperiodic amplification $V_{ap}$ which, as will be described in more detail below, is the value that will cause the angle $\alpha$ between the rotor element and the gyrocompass casing to become stabilized as quickly as possible. However, this angle produces a certain "north error," and this error can be substantially reduced if the amplification factor is greater than $V_{ap}$. Such higher amplification, however, would materially increase the time it takes for the angle $\alpha$ to become stabilized, i.e., the warm-up time of the gyrocompass. According to a further feature of the present invention, therefore, the amplifier is a variable one and, while initially set to produce the aperiodic amplification $V_{ap}$, is adjusted to assume a higher amplification value after the angle $\alpha$ has reached a predetermined minimum value. In this way, the north error is reduced without, however, increasing the warm-up time of the gyrocompass.

DESCRIPTION OF THE PREFERRED EMBODIMENTS

It is often assumed, as a rough approximation, that the spin reference axis of the gyrocompass casing surrounding the gyrocompass rotor and first frame will, after the warm-up time of the system, orient itself precisely to the north-south direction. However, as will now be explained in conjunction with FIGURES 1, 2 and 3, the spin reference axis of the gyrocompass casing will, in practice, assume an orientation which differs slightly from the true north-south direction. The magnitude of this error angle, as the difference between the true north-south direction and the direction actually assumed by the spin reference axis of the casing may be termed, can not be predicted with accuracy, inasmuch as the rotational speed of the compass as it warms up and ultimately assumes its rest position can vary within certain limits, and the precise speed will be determined by a number of random factors. Hereinafter, reference will be made to the greatest possible error angle $\gamma$, namely $\gamma_0$ which will hereinafter be termed simply as the north error.

Figure 1:
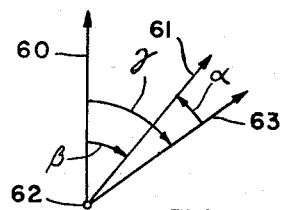
FIGURE 1 is a vector diagram showing the relevant axis and angles between the various elements of the gyrocompass system.

In FIGURE 1, the arrow 60 represents the true or geographic north direction, and can therefore be considered to be a fixed direction. Arrow 61 represents the spin axis of the north-seeking gyro rotor. This rotor can turn only about this spin axis and about a further axis 62, namely, the vertical axis which passes through the center of the earth and which is perpendicular to the plane of the drawing. The spin reference axis of the gyrocompass casing, represented by arrow 63, is also rotatable about the vertical axis 62. The casing is, as described above, elastically connected with the spin axis. This elastic connection has the effect that when the spin axis and spin reference axis, represented by arrows 61 and 63, form an angle $\alpha$ with each other, a moment $M_F = D\alpha$ is produced which tends to bring the two arrows into alignment with each other. Here, D is the directional spring constant of the elastic connection. Due to the earth's rotation, there is exerted on the spin axis, which forms an angle with true north, moment $M_N$ that drives the spin axis toward the north direction, as follows:

$$-M_N = \theta \omega \omega^* \cos \phi \sin \beta = -D\alpha = M_F$$

where $\theta$ = the moment of inertia with respect to the spin axis,
$\omega$ = the angular speed of the rotor,
$\omega^*$ = the angular speed of the earth,
$\phi$ = the geographic latitude of the location of the gyrocompass,
$\beta$ = the angle between the rotor spin (arrow 61 in FIGURE 1) and the north direction (arrow 60 in FIGURE 1).

As is readily apparent from FIGURE 1, $$\alpha = b - \gamma$$

Figure 3:
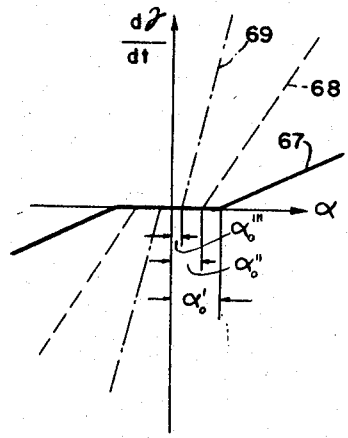
FIGURE 3 is a graph showing various characteristics of the system.

The follow-up system associated with the gyrocompass, namely, the pick-off, the electronic amplifier and the servo-motor, and any transmission additionally associated with these components, behaves as an integrator, and causes the casing, as represented by arrow 63, to be rotated in the direction of the angle $\alpha$ at a rate which is proportional to the angle $\alpha$ (see also FIGURE 3).

Figure 2:
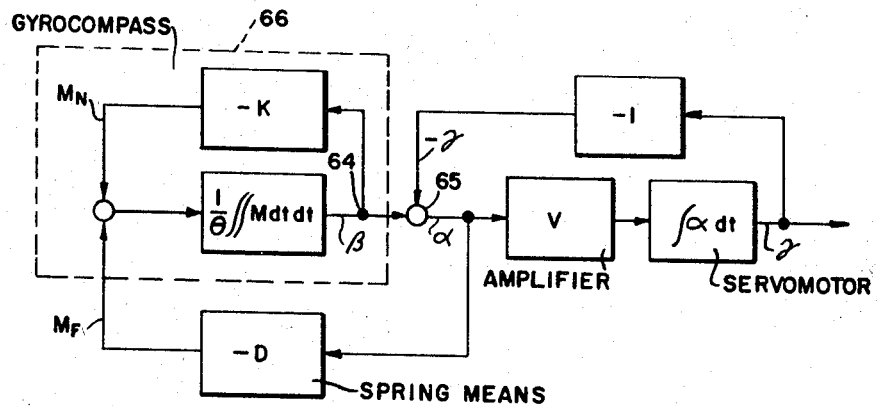
FIGURE 2 is a block diagram of a gyrocompass system, showing the interaction of the various forces and components.

There is thus obtained the block diagram of FIGURE 2 in which the relationship between the input and output signals is shown within the respective blocks. The arrow in the connecting lines between the blocks show the direction of the signals, i.e., they identify input and output signals. It is assumed, in each case, that the input signals control the output signals and that there is no internal feedback within any one block, so that each block is a one-way transmission element. The block diagram also shows branch points, represented by solid dots, e.g., 64, which indicate that the signal flowing into the junction flows out into more than one component, each of which receives the same signal. Conversely, a circular junction, e.g., 65, represents an additive junction, in that the signal flowing out of each such junction is the mathematical sum of the signals flowing into the junction.

The components embraced by the dashed rectangle 66 represent a simple north-seeking gyrocompass with one degree of freedom and without damping. The block contains the function $$k = \theta \omega \omega^* \cos \phi = -\frac{M_N}{\sin \beta}$$

i.e., the specific north-driving moment together with a minus sign. Since, in practice, the angle $\beta$ will be small, $\sin \beta$ can be replaced by $\beta$ (linearizing $k$ as a function of $\beta$), so that $$M_N = -k\beta$$

The moment $M_N$ drives the spin axis north about the vertical axis. In accordance with Newton's law, $$\theta_z \frac{d^2\beta}{dt^2} = M$$

the angle $\beta$ is also obtained from the north-driving moment in the second block by dividing by the moment of inertia $\theta_z$ of the first frame and rotor with respect to the vertical axis and by integrating twice with respect to the time $t$.

The gyrocompass according to the present invention, however, is—as explained above—elastically coupled with respect to the vertical axis. Thus, the spring moment $M_F$ must always be added to the north-driving moment $M_N$. This spring moment $M_F$ is proportional to the angle $\alpha$. As is apparent from FIGURES 1 and 2, $\alpha = \beta - \gamma$.

In FIGURE 2, the block V represents an amplifier for linearly amplifying $\alpha$. The next block represents the servomotor and the transmission and thus acts as integrator which integrates $\alpha$ with respect to time, so that there is finally obtained the error angle $\gamma$, which, in the ideal case, is equal to 0. The value $\gamma$ is then multiplied by $-1$ and the value $-\gamma$ is added to $\beta$, at 65.

The operation of the system shown in FIGURE 2 may be described mathematically as follows:

$$s^3 + Vs^2 + \frac{k+D}{\theta_z} \cdot s + \frac{kV}{\theta_z} = 0$$

This characteristic equation of the system describes the oscillatory behavior. Solving the equation for $s$ gives the characteristic value for the system. If the amplification V approaches infinity, the system acts as if only those components embraced within the rectangle 66 were provided, in which case the oscillations are not damped and the characteristic values are purely imaginary. Similarly, the characteristic values can be imaginary, but of different amounts, if V approaches 0. The system is damped only if V has a finite value, in which case the characteristic value $s$ will be real.

If the amplification has a definite finite value $$V_{ap} = \frac{k+D}{2\sqrt{k\theta_z}}$$

there will be obtained an aperiodic characteristic value. This amplification $V_{ap}$, which may be termed the aperiodic amplification, is the value with which the initial oscillatory transients will be damped most rapidly, as all other larger and smaller amplification values will result in longer initial transients.

There will now be explained why, in the interest of obtaining a greater accuracy of the true north indication, an amplification value greater than $V_{ap}$ is desirable.

After the warm-up time, i.e., after the initial transients have decayed, $$M_N = -M_F$$

and therefore $$-k\beta = D\alpha$$

Since $$\gamma = \beta - \alpha$$

$$\gamma = -\alpha(1 + D/k)$$

Up to now it was assumed that the characteristic of the follow-up system, i.e., the angular velocity $d\alpha/dt$ over $\alpha$, was a straight line passing through the origin. In that case, the north error $\gamma_0$ would become equal to 0. In practice, however, the follow-up system will have a response threshold $\alpha_0$, which is due mainly to the operation of the servomotor but which may be the result of other causes. What is of importance is that it is the presence of this response threshold which is responsible for the north error, in accordance with the following equation:

$$\gamma_0 = -\alpha_0(1 + D/K)$$

FIGURE 3, in heavy lines, shows the characteristic 67 of a follow-up system, and corresponds, approximately, to the rotational speed characteristic (rotational speed versus applied voltage) of an electric motor of the type normally used in this field. The characteristic shows that the servomotor does not actually respond to the presence of an angle $\alpha$, i.e., that the motor will not rotate, in either direction, until the angle is at least equal to $\alpha_0'$. If, however, the amplification of the pick-up and/or the amplification of the electronic amplifier is increased, this is equivalent to "compressing" the scale along the $\alpha$-axis. This, in turn, means that the characteristic will have a steeper slope, as shown by either the dasher line 68 and the phantom line 69, depending on how much the $\alpha$-axis is compressed. And this, in turn, results in smaller response thresholds $\alpha_0''$ and $\alpha_0'''$, respectively. Thus, it will be seen that the greater the amplification, the smaller will be the north error. But, as explained above, the warm-up time is greater.

Accordingly, there is provided, in accordance with a further feature of the present invention, an amplifier whose amplification is adjustable. When the gyrocompass is first turned on, the amplifier will be adjusted to produce at least approximately the already described aperiodic amplification, and this adjustment is maintained until the initial transients have decayed, i.e., until the gyrocompass is stabilized in its quiescent state and $\alpha$ is below a predetermined threshold value. The amplifier is then adjusted to the maximum amplification, as a result of which the error angle $\gamma$ decreases—virtually without transient oscillations—to the smallest possible value. This last-mentioned interval, i.e., the time it takes for the gyrocompass to stabilize with its new amplifier setting, is negligibly small as compared to the time which it would have taken the gyrocompass to stabilize if the amplifier had originally been adjusted to the high amplification value which, ultimately, produces the small north error.

In practice, the amplifier is adjusted automatically, i.e., changing the setting of the amplifier from $V_{ap}$ to $V_{max}$ can be effected by automatic means. Accordingly, means are provided which sense when a given threshold value of $\alpha$ is reached and which, when this value is reached or when $\alpha$ is below this value, put out a signal which changes the adjustment of the amplifier from $V_{ap}$ to $V_{max}$. The threshold value $\alpha$ can readily be selected once the transient characteristics of the system are known. If the system tends to overcontrol, the change-over from $V_{ap}$ to $V_{max}$ may be delayed for a certain time interval after the threshold value of $\alpha$ has been reached.

Figure 4:
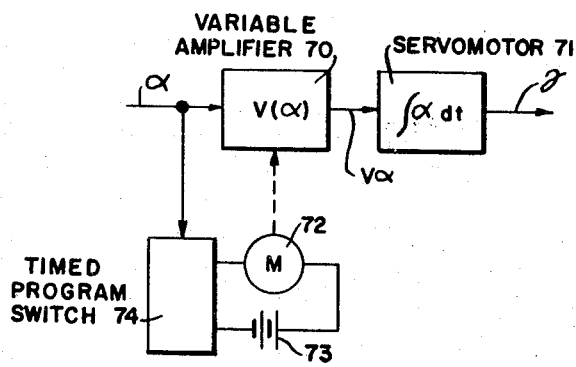
FIGURE 4 is a block diagram of one embodiment of the amplifier control system according to the present invention for increasing the amplification to decrease the north error.

FIGURE 4 is a block diagram of one embodiment of a circuit arrangement in which the amplification is increased above $V_{ap}$. In FIGURE 4, blocks 70 and 71 are to be considered as incorporating the correspondingly legended components of FIGURE 2. Thus, block 70 represents the pick-up and amplifier, while block 71 represents the servomotor and transmission. A signal $\alpha$ is applied to the input of block 71, shown at the left, so that the output is $V\alpha$. Block 70 is legended $V(\alpha)$ to indicate that the amplification is variable. The amplifier is controlled by a motor 72 which adjusts the amplification value. This motor 72 is energized by a source of electrical energy such as a battery 73, the motor 72 and the battery 73 being connected in circuit with a timed program switch 74. The signal $\alpha$ is also used to start the switch 74, the connection being such that the switch begins to operate when $\alpha$ drops below the value at which the system normally assumes its stabilized quiescent state.

The circuit of FIGURE 4 operates as follows: when the gyrocompass is first put into operation, the amplifier unit 70 is adjusted to produce aperiodic amplification ($V_{ap}$), so that the compass will quickly assume its stabilized state. There will, however, remain a certain north error. Once the system has reached its stabilized state, the elastic deflection will also have dropped to or below a given limit value. As a result, the timed program switch is put into operation and the motor 72 then adjusts the amplifier so as to increase the amplification value from $V_{ap}$ to a predetermined maximum value $V_{max}$; if desired, the amplification can be increased in a stepwise manner. In this way, the response thresholds of the servomotor unit of the follow-up system, depicted by block 71, move closer together (see FIGURE 3) and the gyrocompass casing will align itself with the earth's axis more accurately.

Figure 5:
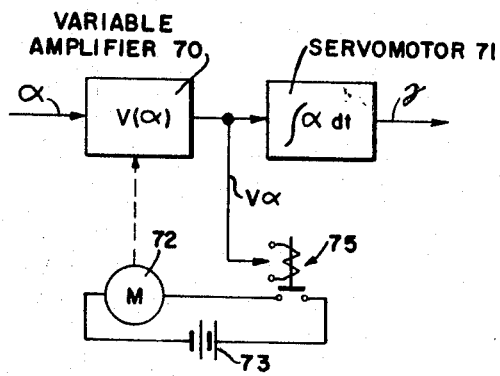
FIGURE 5 is a block diagram of another embodiment of the amplifier control system for increasing the amplification and hence decreasing the north error.

FIGURE 5 is a block diagram of another embodiment of a circuit arrangement in which the amplification is increased above $V_{ap}$. Here, it is not the signal $\alpha$ but the amplified signal $V\alpha$ which is taken off between blocks 70 and 71 and which is used for controlling the change of amplification. When $\alpha$ and hence $V\alpha$ have dropped below the predetermined threshold value, the signal $V\alpha$ actuates a relay 75 so as to energize the regulating motor 72.

The circuit of FIGURE 5 operates as follows: the block 70 is initially adjusted to produce the amplification $V_{ap}$. When $V\alpha$ and $\alpha$ have fallen below the predetermined threshold value, the relay 75 switches on the motor 72 and this increases the amplification. This increases $V\alpha$ and the relay is de-energized, thereby shutting off the motor 72. But as $\alpha$ continues to decrease, the relay will once more be energized, and this cycle continues until the maximum amplification $V_{max}$ is reached.

It will be appreciated that while the amplifier control means have been shown as being constituted by electromechanical components, electronic components may readily be used instead.

It will also be seen from the above description that, thanks to the fact that the follow-up system incorporates an adjustable amplifier whose amplification can be changed between $V_{ap}$ and a greater amplification, the gyrocompass will rapidly reach its initial stabilized position, after which the remaining north error can be reduced even further. There is thus obtained the advantage of increased accuracy without suffering the penalty of prolonged warm-up time.

It will be understood that the above description of the present invention is susceptible to various modifications, changes and adaptations.

I claim:
1. In a one-degree-of-freedom gyrocompass including a frame, a rotor mounted in the frame for rotation about a spin axis, and an electric drive motor for the rotor, a gyrocompass casing within which the frame is mounted, by a gas bearing, for rotation about a vertical axis, mechanical spring means elastically interconnecting the frame and the gyrocompass casing for opposing relative rotation between the two, said spring means further being a means for supplying electrical energy to the drive motor from an external source of electrical energy, pick-off means associated with the frame and the casing for producing an output signal proportional to the angle about the vertical axis between the rotor spin axis and a predetermined diametral plane of the casing, and driving means connected to rotate the casing about the vertical axis for reducing the angle between such diametral plane and the rotor spin axis, the improvement comprising a follow-up system having an input connected to said pick-off means and an output connected to said driving means and including an amplifier for producing substantially aperiodic amplification

$$V_{ap} = \frac{k+D}{2\sqrt{k\theta_z}}$$

where $D =$ spring constant of said spring means,
$\theta_z =$ moment of inertia of said frame and rotor with respect to said vertical axis, and
$k =$ the (linearized) specific north-driving moment $= \theta\omega\omega^* \cos\phi$, where $\theta =$ the moment of inertia of said rotor with respect to said spin axis,
$\omega =$ the angular speed of said rotor,
$\omega^* =$ the angular speed of the earth, and
$\phi =$ the geographic latitude of the location of the gyrocompass.

2. In a gyrocompass as defined in claim 1 said amplifier being variable between $V_{ap}$ and a value $V_{max}$ greater than $V_{ap}$, and said follow-up system further comprising amplifier control means for increasing the amplification of said amplifier above $V_{ap}$ during north alignment and after the angle $\alpha$ between said frame and said gyrocompass casing has fallen below a predetermined value.

3. In a gyrocompass as defined in claim 2, said amplifier control means comprising a timed program switch for controlling the increase of the amplification of said amplifier.

4. In a gyrocompass as defined in claim 2, said amplifier control means being connected to receive a signal which is a function of said angle $\alpha$ between said frame and said gyrocompass casing for increasing the amplification as said angle $\alpha$ decreases.

5. In a gyrocompass as defined in claim 2, said amplifier control means being connected to receive a signal which is a function of the amplification V times said angle $\alpha$ between said frame and said gyrocompass casing.

References Cited

UNITED STATES PATENTS

| | | |
|---|---|---|
| 3,122,842 | 3/1964 | Wrigley et al. |
| 2,606,447 | 8/1952 | Boltinghouse. |
| 3,173,215 | 3/1965 | Johnston. |
| 3,194,613 | 7/1965 | Pierry et al. |
| 3,231,984 | 2/1966 | Howe et al. |

ROBERT B. HULL, *Primary Examiner.*

U.S. Cl. X. R.

74—5.5